(12) United States Patent
DuFour

(10) Patent No.: US 7,108,442 B2
(45) Date of Patent: Sep. 19, 2006

(54) OVERMOLDED TIP

(75) Inventor: Jean Claude DuFour, Tournus (FR)

(73) Assignee: Rexam Services S.A.S., (FR)

( * ) Notice: Subject to any disclaimer, the term of this patent is extended or adjusted under 35 U.S.C. 154(b) by 0 days.

(21) Appl. No.: 10/636,658

(22) Filed: Aug. 8, 2003

(65) Prior Publication Data

US 2005/0019091 A1   Jan. 27, 2005

(30) Foreign Application Priority Data

Jul. 21, 2003   (FR) ................... 03 08883

(51) Int. Cl.
*A47L 13/30* (2006.01)
*B05C 11/00* (2006.01)
*B43M 11/06* (2006.01)
*B65D 25/40* (2006.01)

(52) U.S. Cl. .............. 401/263; 401/186; 401/266; 222/494; 222/495

(58) Field of Classification Search ........ 401/183–186, 401/263, 265, 266; 222/491, 494, 495
See application file for complete search history.

(56) References Cited

U.S. PATENT DOCUMENTS

| | | | | |
|---|---|---|---|---|
| 1,979,218 A | * | 10/1934 | Bergstrom et al. | 401/131 |
| 2,075,249 A | * | 3/1937 | Wilson | 222/501 |
| 2,416,705 A | * | 3/1947 | Mazzarelli | 401/264 |
| 2,913,748 A | * | 11/1959 | Felter | 401/264 |
| 4,230,240 A | * | 10/1980 | Laauwe | 222/212 |
| 4,844,250 A | * | 7/1989 | Holoubek et al. | 222/107 |
| 6,536,631 B1 | * | 3/2003 | Nickels et al. | 222/212 |

* cited by examiner

*Primary Examiner*—David J. Walczak
(74) *Attorney, Agent, or Firm*—St. Onge Stewart Johnston & Reens LLC

(57) ABSTRACT

Applicator tip for applying liquid product, comprising an elastically deformable outer applicator element provided with a dispensing orifice able to be sealed closed by a shut-off element, and a rigid inner body the upper part of which bears the shut-off element as a projection and is covered, around the shut-off element, with the outer applicator element.

8 Claims, 2 Drawing Sheets

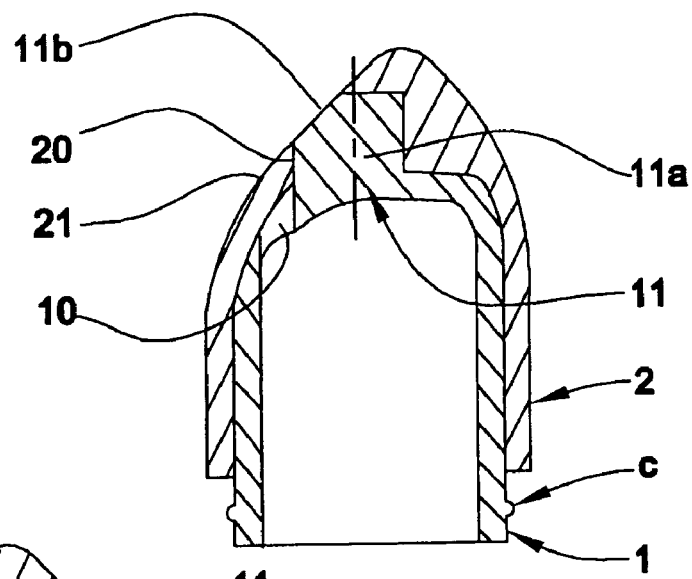
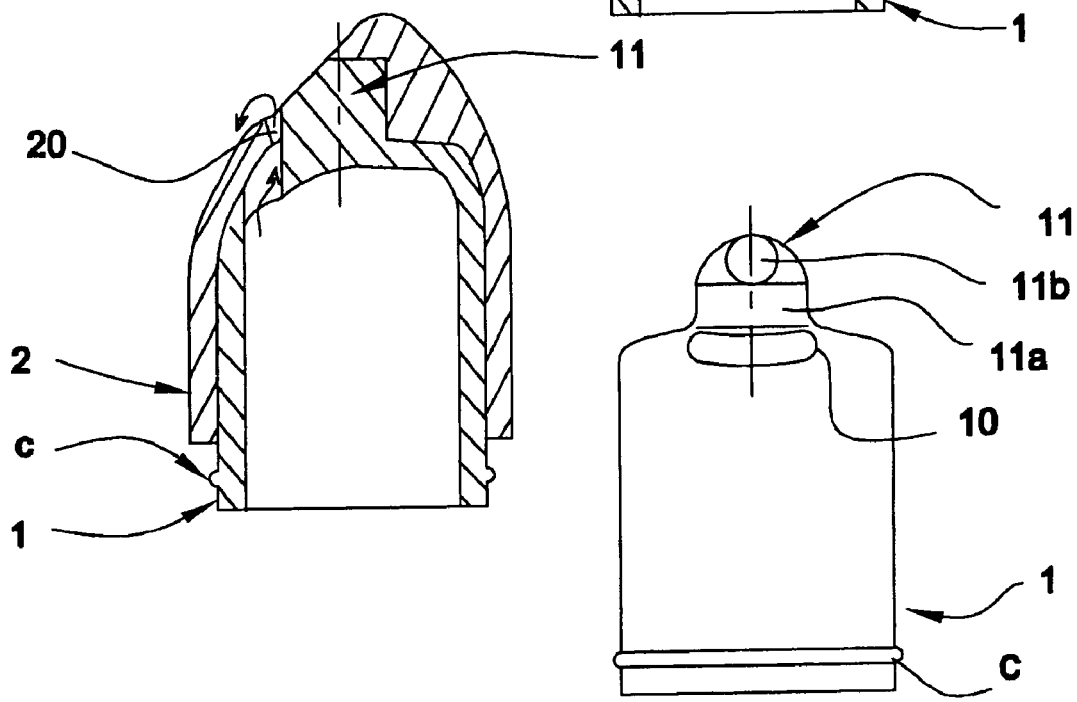

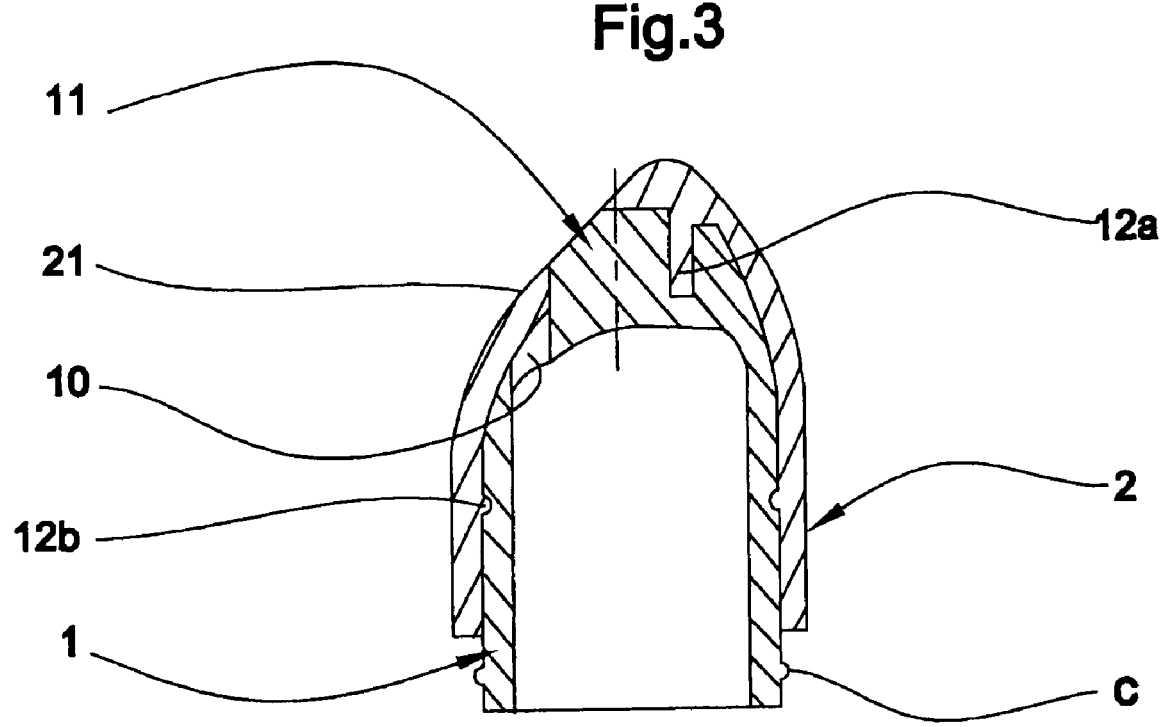

OVERMOLDED TIP

BACKGROUND OF THE INVENTION

The present invention relates to an applicator tip for applying liquid products.

More specifically, the invention applies to liquid or semi-liquid cosmetic or pharmaceutical products intended to be used in particular on all or part of the human body, especially the face.

Traditional tips comprise an elastically deformable outer applicator element provided with a dispensing orifice able to be sealed closed by an inner shut-off element forming a shutter.

However, these tips are generally made as one piece with the product dispenser, and this does not allow their profile and the texture of the applicator element to be tailored to the specific requirements of the sensitive areas of the face that are to be treated.

Another difficulty lies in the search for good sealing in that the parts of which traditional tips are made are produced separately and mechanically assembled, thus generating significant risks of leakage at the shutter, particularly in the case of highly fluid products.

Furthermore, the drying of a residual dose of product at the shutter is likely to lead to problems of obstruction.

In addition, mechanical assembly involves an additional operation of indexing the various parts, and this makes the manufacturing method more complicated.

SUMMARY OF THE INVENTION

It is an object of the present invention to address these technical problems in a satisfactory way.

This object is achieved according to the invention, by means of an applicator tip comprising an inner body the upper part of which bears a shut-off element as a projection and is covered, around the shut-off element, with the outer applicator element.

According to an advantageous feature, the rigid body is equipped with a discharge duct contiguous with the shut-off element and shut off by a flexible lip secured to the outer applicator element. According to another feature, the applicator element is in the form of a skin fixed by overmolding to the rigid body, at least partially hugging its profile.

As a preference, the tip has a cylindroconical profile, and the dispensing orifice may be made on an angled face of the applicator element. According to an advantageous alternative form, the body has at least one groove for securing the applicator element.

According to another alternative form, the shut-off element is in the form of a valve needle borne by the top of the body and flush with the surface of the applicator element. This valve needle may be a cylinder with an angled circular facet. As a preference, the lower part of the body is provided with elements for connection with a dispenser.

Another aspect of the invention is a method of manufacturing an applicator tip for applying a liquid product, wherein an inner body of cylindroconical profile provided with a discharge duct adjacent to a projecting shut-off element is provided, then an outer applicator element is made in the form of an elastically deformable skin at least partially hugging the body and bearing a flexible lip flush with the shut-off element.

According to an preferred form of the method, the outer applicator element is made by overmolding the body and when the tip is released from the mold, the lip is detached from the shut-off element. According to another alternative form, the outer applicator element is produced in the hot state to allow it to shrink onto the body as it later cools. As a preference, the body and the skin are made of two different materials which are not subject to significant interpenetration.

One advantageous step in the method consists in making the body by means of molding, either injection molding or compression molding.

The tip of the invention can be mounted on various types of dispenser and allows both comfortable and precise application of product to the face or any other part of the human body. It also provides a good seal allowing it to be used with sterile products. In particular, the proximity of the duct and of the valve needle allows the lip, as the shutter closes, to eject the residual product. The applicator element may adopt various shapes and sizes according to the anticipated type of use.

The method of manufacturing the tip is also particularly simple and easy to implement and thus offers a very economical cost price.

BRIEF DESCRIPTION OF THE DRAWINGS

The invention will be better understood from reading the following description of certain embodiments of the invention, with reference to the drawings in which:

FIGS. 1A and 1B depict views in section of one embodiment of the tip of the invention, in the closed position and in the open position respectively.

FIG. 2 depicts a front view of the rigid body of the tip of FIG. 1.

FIG. 3 depicts a view in section of another embodiment of the tip of the invention.

DETAILED DESCRIPTION OF EMBODIMENTS

The following is a description of certain embodiments of the invention, given by way of example only, to more clearly describe the invention.

The tip of the invention has a cylindroconical overall profile with, in the embodiments depicted in FIGS. 1A, 1B and 3, a truncated or angled face here located on the left and an ogee-shaped top. In these embodiments the tip comprises a hollow rigid inner body 1, depicted in detail in FIG. 2. The upper part of inner body 1 is covered with an outer applicator element 2 provided with a dispensing orifice 20 able to be sealed closed by a projecting inner shut-off element 11 forming a shutter.

The lower part of body 1 is provided with elements C for connection with the reservoir of a dispenser (these are not depicted). The outer applicator element 2 covers the wall of the body 1 except for the end of the shut-off element 11, which it surrounds, lying flush with the truncated face of the tip at which the product is delivered.

The shut-off element here is produced in the form of a cylindrical valve needle 11a borne by the top of the body 1 with an angled circular facet 11b situated in the plane of the truncated face of the applicator element 2 so as to offer a smooth and ergonomic application surface. The outer applicator element 2 is produced in the form of an elastically deformable skin fixed to the body 1, at least partially hugging its profile.

The body 1 is equipped with a duct 10 for discharging the product, contiguous with the shut-off element 11. Duct 10 is shut off, when the tip is in the closed position, by a flexible lip 21 secured to the outer applicator element 2, as depicted in FIG. 1A. Duct 10 opens onto the truncated face of the tip, in line with the valve needle 11a and in the embodiment shown in FIG. 2 has a kidney bean cross section.

When the dispenser is used by a consumer, the reservoir is placed under pressure and the product enters the duct 10 in the tip, as depicted in FIG. 1B. Lifting lip 21 of the skin, the product escapes to the outside along a lateral wall of valve needle 11a, before flowing over the truncated face of the applicator element 2. In the embodiment shown, the deflection of lip 21 is about an axis passing through the lower edge of the duct 10.

In the embodiment of FIG. 3, the body 1 has an upper groove 12a and a lateral groove 12b for securing applicator element 2 in the wall of body 1 to strengthen the attachment of the skin to the tip.

The tip of the invention is preferably made in two main stages. The first stage involves manufacturing the body 1, using conventional techniques, for example by molding (compression molding or injection molding) of a rigid plastic.

The next stage involves making the skin 2. This operation is preferably performed by overmolding on the body and around the valve needle 11a, using an elastically deformable material (of the elastomer type). The material is preferably chemically different from the material of which the body 1 is made, so as to avoid any interpenetration of material, at least with the valve needle 11a.

The overmolding may be performed either in the same mold as was used to manufacture the body, or using a different mold in which the previously produced body is placed. The overmolding is preferably performed in the hot state, and the subsequent cooling of the material of which the skin is made is accompanied by a contraction or shrink-fitting phenomenon which results in the skin 2 shrinking onto the body 1. This shrinkage, associated with the securing in the grooves 12a, 12b of the body, is enough to hold the skin in place without the need to use any other fixing means. In any event, care should be taken not to cover the upper facet of the valve needle 11a and not to create any residual adhesion between the flexible lip 21 and the lateral wall of the valve needle, particularly at the mouth of the duct 10, in order to allow subsequent escape of the product.

The skin 2 should at least partially hug the external profile of the body 1 and preferably lies flush with the facet 11b of the shut-off valve needle 11, thus delimiting a flat product-application surface. The thickness of the skin 2 is preferably between 0.1 mm and a few millimeters and the flexible lip 21 may have a thinned profile to encourage it to deflect and/or to improve the sealing and the precision of the dosing of the product.

As appropriate, when releasing the tip from the mold, a checking operation should be performed with a view to guaranteeing detachment of the parts of the lip that may have remained attached to the valve needle 11a.

Thus, the invention has been described by reference to certain embodiments. It will be recognized that these embodiments are susceptible to various modifications and alternative forms well known to those of skill in the art, without departing from the spirit and scope of the invention. Accordingly, although specific embodiments have been described, these are examples only and are not limiting upon the scope of the invention.

What is claimed is:

1. An applicator tip for applying liquid product comprising:
   a rigid inner body having an upper part comprising a projection serving as a shut-off element; and
   an elastically deformable outer applicator element covering the shut-off element, the outer applicator element comprising a dispensing orifice able to be sealed closed by the shut-off element;
   wherein the applicator tip comprises a cylindroconical outer surface defining an angled face, and wherein the dispensing orifice is disposed on the angled face; and
   wherein the rigid inner body is equipped with a discharge duct contiguous with the shut-off element and shut off by a flexible lip secured to the outer applicator element.

2. The tip as claimed in claim 1, wherein the outer applicator element comprises a skin fixed by overmolding to the rigid inner body, at least partially hugging the profile of the rigid inner body.

3. The tip as claimed in claim 2, wherein the shut-off element comprises a valve needle borne by the top of the inner rigid body and flush with a surface of the outer applicator element.

4. The tip as claimed in claim 2, wherein the inner rigid body has at least one groove for securing the outer applicator element.

5. The tip as claimed in claim 1, wherein the shut-off element comprises a valve needle borne by the top of the inner rigid body and flush with a surface of the outer applicator element.

6. The tip as claimed in claim 5, wherein the valve needle comprises a cylinder with an angled circular facet.

7. The tip as claimed in claim 6, wherein a lower part of the inner rigid body is provided with elements for connection with a dispenser.

8. An applicator tip for applying liquid product comprising:
   a rigid inner body having an upper part comprising a projection serving as a shut-off element; and
   an elastically deformable outer applicator element covering the shut-off element, the outer applicator element comprising a dispensing orifice able to be sealed closed by the shut-off element;
   wherein the applicator tip comprises a cylindroconical outer surface defining an angled face, and wherein the dispensing orifice is disposed on the angled face;
   wherein the outer applicator element comprises a skin fixed by overmolding to the rigid inner body, at least partially hugging the profile of the rigid inner body.

* * * * *